Feb. 8, 1966  A. D. KIFFER ETAL  3,234,051
USE OF TWO MAGNETIC FIELDS IN A LOW PRESSURE ARC SYSTEM
FOR GROWING CRYSTALS
Filed Aug. 7, 1962

INVENTORS
ALFRED D. KIFFER
ONTARIO H. NESTOR
LOWELL G. TENSMEYER
BILLIE J. CORBITT

BY *Dominic J. Geminello*

ATTORNEY

# United States Patent Office 3,234,051
Patented Feb. 8, 1966

3,234,051
USE OF TWO MAGNETIC FIELDS IN A LOW PRESSURE ARC SYSTEM FOR GROWING CRYSTALS
Alfred D. Kiffer, Ontario H. Nestor, and Lowell G. Tensmeyer, Indianapolis, and Billie J. Corbitt, Danville, Ind., assignors to Union Carbide Corporation, a corporation of New York
Filed Aug. 7, 1962, Ser. No. 215,433
2 Claims. (Cl. 148—1.6)

This invention relates to a novel process and apparatus for growing crystalline boules and more particularly to a magnetically stabilized low pressure arc process for growing unicrystalline and polycrystalline boules or ingots of refractory metals, metal compound and alloys.

Massive crystalline boules, and especially large unicrystalline boules, of various materials have been grown previously by the Verneuil process described in U.S. Patent No. 988,230. In this technique powdered feed constituents are introduced to the boule-growing zone where such constituents are heated and melted by an oxygen-hydrogen flame, for example. The molten material drops onto a support rod where it adheres and grows into a boule, and the support rod is gradually lowered away from the oxy-hydrogen flame so that only the growing surface of the boule is maintained in the molten state. This technique, even though using a high temperature oxygen-hydrogen flame as the heat source, was limited to crystal raw materials which were easily fused, such as corundum, spinel and rutile.

One improvement over the Verneuil process involved the use of an auxiliary electric arc between an electrode and the boule support to supply additional heat to the combustion gases from the oxy-hydrogen flame. These known processes employing combustion reactions are limited to the growth of boules having compositions compatible with the chemical reactions occurring in the combustion flame. For example, a process using an oxy-hydrogen flame is not satisfactory for growth of boules containing elemental metals, such as tungsten, nickel, cobalt and silicon, as the ever-present oxygen reacts with the metal to form metal oxides which deleteriously contaminate the desired elemental metal in the boule.

Another disadvantage of the prior Verneuil process is its limitation in control of heat input to the boule-growing surface. The temperature in the boule-growing zone is determined by the combustion fuel-oxidant ratio. Since this ratio can usually be varied only over a relatively narrow range to get desired combustion characteristics, the temperature control is thus restricted. Furthermore, the heat input is primarily limited by the maximum temperature attainable with combustion reactions.

One attempt in the prior art to alleviate the limitations placed upon crystal growth by the use of combustion reactions used a collimated high pressure electric arc as the sole heat source. This is described in U.S. 2,970,895. It has the disadvantage of producing extremely high heat and momentum concentration at the molten boule surface thus requiring very close control in order to achieve useful boule results.

Still another process variation has been tried in the prior art to obtain satisfactory high temperature crystal growth. This process employed an atmospheric pressure, freely-burning open arc between a stick-type electrode and the molten boule surface as the heat source. While this prior process is quite useful for growing massive crystalline boules of refractory materials, such boules being desirably substantially unicrystalline and of high purity, it is unable to achieve the extremely high purity required for some boule products.

Accordingly, it is the main object of the present invention to provide method and apparatus for producing ultra-high purity refractory metal crystals.

Another object is to provide a process wherein a low pressure arc is magnetically stabilized to control the shape and direction of the arc and thereby permits control of the heat input to the boule surface at the desired growth conditions.

A further object is to provide a process wherein the pressure in the region of the boule surface is controlled to produce high purity crystals.

Another object is to provide a process wherein the pressure in the region of the boule surface is controlled by passing a gas from or around the non-consumable electrode.

Yet another object is to provide a process for growing high purity crystals of materials having a melting point above 1500° C. wherein the pressure at the boule growing surface is between 1 and 1000 microns.

These and other more specific objects will become apparent from the following description and drawings wherein.

Figure 1:
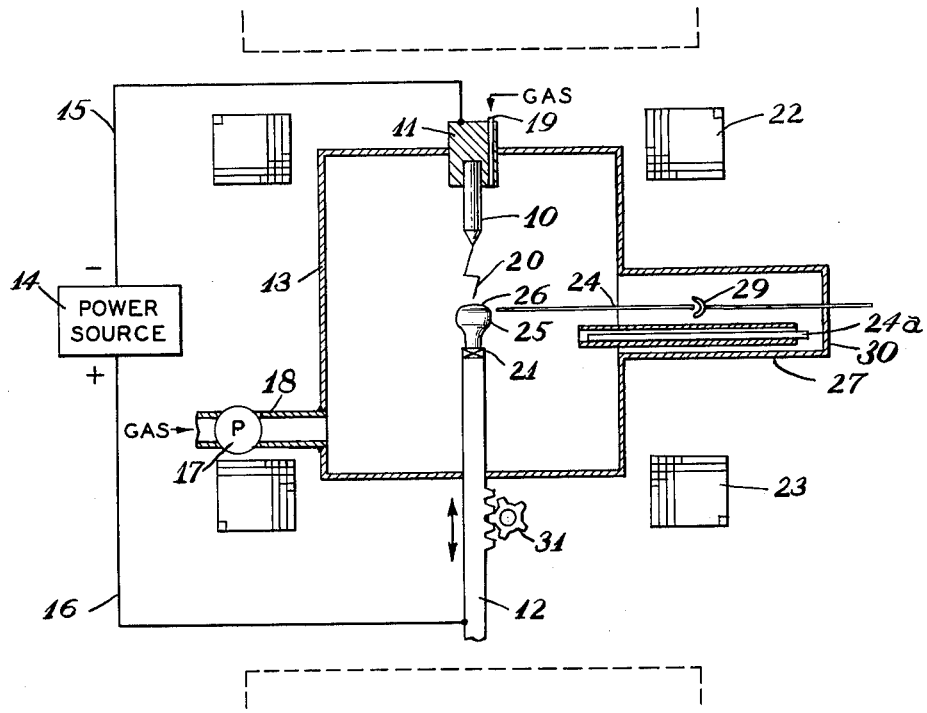
FIGURE 1 is a plan view partially in elevation and partially in cross-section of apparatus for carrying out the invention.

This invention contemplates the growing of high purity crystalline boules through the combination of (1) the low pressure-magnetically stabilized arc for high temperatures, and (2) the passing of a gas from or around the non-consumable electrode to the boule so as to control the pressure at the anode boule surface and to sweep away the impurities.

An advance has now been made in the art of crystal growth and especially in the growth of refractory material boules and polycrystalline ingots wherein a magnetically stabilized, low-pressure electric arc in a boule material vapor-inert gas atmosphere of less than 30 mm. mercury pressure is used as the heat source. This arc is struck and maintained inside a chamber between a non-consumable electrode and the growing boule surface as the other electrode. Crystal growth is carried out by feeding raw material in convenient form, such as wire, rod or powder, to the growing boule or ingot surface where it is melted and then solidified as a part of the boule or ingot. The high purity of the boule is maintained by controlling the pressure at the boule growing surface. This is accomplished by passing a gas around the non-consumable electrode to the boule surface.

This improved process has several advantages. First, the use of a magnetically-stabilized arc enables close control to be obtained over the shape and direction of the arc. This allows the heat input to the boule surface electrode to be maintained at desired growth conditions. Magnetic stabilization, however, is only effective on reduced pressure arcs in the pressure range below about 30 mm. mercury. Preferably the arc operation is in the pressure range below about 3 mm. mercury in order to attain maximum control over the arc.

As previously mentioned, magnetic stabilization exists whenever a magnetic field has sufficient influence on the arc to cause the arc current to follow the direction of the magnetic field. If a strong magnetic field is applied to the arc area parallel to the direction of the arc current, the arc will tend to become columnar. Variation in the strength of the field and its direction can cause a variation in the arc attachment area on the electrodes and thus the heat intensity of the arc. Therefore, the pressure in the arc region must be low enough so that reasonable values for magnetic field strength can be used. A magnetic field strength of at least 200 gauss is required at the cathode region parallel to the arc direction for good magnetic stabilization of the arc.

A second and probably the principal advantage of the present process is the ability to purify the boule material during growth. This apparently takes place through volatilization of impurities under the high temperature, reduced pressure conditions. These impurities can then plate out on the relatively cool walls at the growth chamber or can be exhausted by means of the evacuation pump. As contrasted with an atmospheric pressure, open-arc process, the present improved process can provide a somewhat increased arc intensity to provide the high temperatures that are needed to increase the vapor pressure of impurities so that such impurities may be more easily vaporized and separated from the main boule. As an example of the utility of the present invention, it was found that tungsten boules grown by the magnetically stabilized, low-pressure arc process had oxygen and carbon content appreciably lower than that of tungsten boules grown by an atmospheric pressure arc process. Spectroscopic analysis also did not detect many of the metallic impurities usually found in tungsten boules grown by an atmospheric pressure arc method.

This high purity of the boule requires a low pressure over the boule surface and a sweep of gas over that surface to carry away the impurities. The present invention readily accomplishes this by passing a gas stream from or around the non-consumable electrode to the boule growing surface.

The process will be described in more detail with respect to FIGURE 1. The crystal growth apparatus includes a non-consumable electrode 10 supported by electrode holder 11, a boule support 12, and a chamber 13. A power supply 14 is connected to electrode 10 and boule support 12 through leads 15 and 16, respectively. Chamber 13 is evacuated to desired pressure by vacuum pump 17 in line 18 communicating with chamber 13. Inert gas, such as argon or helium is introduced to chamber 13 through conduit 19 in electrode holder 11 to purge the chamber and aid in control of chamber pressure. An arc 20 is initiated, preferably by means of a high frequency discharge, between electrode 10 and crystal seed 21 positioned on boule support 12. A magnetic field substantially parallel to the longitudinal direction of the arc 20 is maintained at the cathode region conveniently by means of coil 22 through which a controlled current flows from a power source (not shown). A second coil 23 positioned around the boule support 12 controls the magnetic field in the lower portion of chamber 13. The amount of magnetic stabilization of arc 20 is controlled by varying the current in coils 22 and 23. Alternatively, the magnetic field could be obtained by positioning magnetic poles at opposite ends of the apparatus as shown by the dotted lines in the figure. Boule material preferably in the form of wire or rod 24 is fed into the arc zone. The resulting molten material is deposited on the seed 21 to form a boule 25. During growth the arc is thus maintained between the electrode 10 and the molten cap 26 of boule 25. As the boule grows in length, the boule support 12 is lowered by gear means 31.

Various feed devices might be employed for supplying boule material in wire or rod form to the arc zone. The drawing illustrates a feed means which has been conveniently employed. Chamber 13 is provided with an extension 27 of suitable size and shape. A supply of feed material 24a is positioned within the extension. A control rod 28 with gripper means 29 is positioned within extension 27, and the rod maintains a slidable, pressure-tight relation with the end 30 of extension 27. In operation, control rod 28 is withdrawn to the point that gripper means 29 can grip the end of a feed wire 24. The control rod is then manipulated so as to feed the end of the boule material wire into the arc zone or to contact the end of the wire with the molten boule surface. When the useful length of wire 24 has been supplied to the boule, the control rod is withdrawn and another feed wire is picked up. The cycle of operations is then repeated until the desired size boule is obtained. A sufficient supply of feed wire is initially placed in extension 27 to grow the desired size boule. If insufficient wire is placed in the extension, the arc is shut down, the chamber pressure brought up to atmospheric and then the extension is opened so that additional feed wire may be added. The system is then sealed and the crystal process repeated at reduced pressure conditions.

In order that a high purity boule material may be achieved, that is a boule having a purity of about 99.9%, it is highly important that the pressure at the anode boule be maintained at least as low as a pressure, which is dependent upon the particular boule material being grown. In general, for the high melting point materials, that is, materials having a melting point above 1500° C., the pressure at the boule should be between about 1 and 1000 microns of mercury. For niobium and tantalum, a pressure as low as at least 10 microns is desired, while for tungsten and molybdenum a pressure as low as at least 30 microns is preferred.

It is essential that these pressures be maintained through a non-static system. In a static system wherein the chamber pressure would be uniform throughout, there would be no means to carry away the volatilized impurities. Further, it is preferred, from the standpoint of being able to operate at relatively low voltages, to inject the gas flow at the electrode. That is, with the gas being injected at the electrode, and adequate supply of needed ions is available at the electrode, thereby requiring less voltage for electron emission.

Further, better control of the pressure at the anode boule surface may be achieved with the gas flow coming from the electrode. Various means may be used to exercise such control. For example, the quantity of gas flow can be varied, or the distance between the electrode and the boule surface could be varied. As another alternative, various pump sizes could be used.

The present invention is useful for growing massive crystalline boules and polycrystalline ingots of materials which are electrically conductive at least at the high temperatures achieved in the molten boule cap, otherwise the boule could not be an electrode. The following example describes operation of the present invention to grow a tungsten boule.

*Example I.—Growth of tungsten boule*

Apparatus of the general type shown in the accompanying FIG. 1 was employed. The cathode was a ⅛-in. dia. thoriated tungsten stick electrode, and the anode was a ⅝-in. dia. tungsten crystalline boule previously prepared in an atmospheric pressure arc growth process. The chamber was first evacuated to remove substantially all contaminants. Chamber pressure was then established at 2 mm. mercury by slowly introducing argon gas and continuously evacuating the chamber by means of a vacuum pump. A current of 100 amperes was passed in series through the upper and lower magnetic field coils. The coils were connected so as to have their fields in the same direction. An arc of about 100 amperes was then established between the cathode and anode by means of a high-frequency electrical discharge. Once the arc was started, the magnetic coil current was quickly reduced to 30 amperes (about 275 gauss field strength), the arc current was increased to about 217 amperes, and the pressure was reduced to 220 microns. Argon gas was fed to the boule surface at a rate of 25 cc./min. The calculated pressure at the boule surface was about 30 microns of mercury. The arc length was ½-in. and the arc voltage was 30–34 volts. Hydrogen-reduced tungsten wire of ¹⁄₁₆-in. dia. and 8-in. long had previously been placed within the arc chamber. This wire was manipulated from outside the chamber through pressure-tight controls so as to feed the wire into the molten anode surface. During a run of about 30 minutes about 16 inches of tungsten wire was fed into the anode to form a boule growth about 3/8-in. dia. The equipment was then shut down by extinguishing the arc and stopping the argon flow. The chamber pressure was reduced to about 0.5 micron and maintained at this pressure for 7 minutes to let the boule cool down. The chamber pressure was then increased to atmospheric by introducing argon.

The chamber was opened and two more hydrogen-reduced tungsten wired 1/16-in. dia. and 12 inches long were placed within the chamber. It was sealed and the operation repeated substantially as described above to feed 17 inches of tungsten wire in 5 minutes to the molten anode surface.

The chamber was again reloaded with two tungsten wires and the growth process repeated. The total new boule growth in these three runs was about 1/2-in dia. and 1/2-in. long.

This new growth section was sawed-off the tungsten seed anode. The tungsten crystal grown by this technique had an average hardness of 369 Vickers as measured with a 300 gram load. This is softer than the 387 Vickers obtained with tungsten grown in an atmospheric pressure argon arc process. Emission spectroscopy analysis indicated that the silicon, copper and chromium impurities of the tungsten crystal were reduced to an undetectable amount. This is below the values normally found in a tungsten crystal obtained by atmospheric pressure arc growth techniques. Oxygen analysis also indicated a reduction in oxygen content from 15 p.p.m. (atmospheric arc grown material) to 5 p.p.m.

These analyses all point out the higher purity of the material grown by the reduced pressure, magnetically stabilized arc process.

In runs of the type described in Example I above wherein the upper and lower stabilizing magnetic fields are in series, successful growth of large diameter boules requires extreme care. The magnetic field tends to rotate the molten boule cap. This causes an uneven boule to result and can also cause loss of material. The preferred crystal growth conditions occur when a strong magnetic field exists at the cathode region for control over magnetic stabilization and wherein substantially zero magnetic field exists in the molten boule cap region. These conditions are conveniently achieved by connecting power independently to the upper and lower coils and have them in opposing magnetic relation. The current in the upper cathode coil is adjusted for proper stabilizing properties. The current in the lower anode coil is then increased to the point where the magnetic fields substantially cancel each other in the molten boule cap region.

The following example describes growth of a tungsten boule employing opposing magnetic fields within the chamber.

*Example II.—Growth of tungsten boule*

Apparatus of the type shown in FIG. 1 was used. The cathode was a 1/8-in. dia. thoriated tungsten stick electrode, and the anode was a 7/16-in. dia. single crystal tungsten seed mounted on a metallic boule support. The chamber was evacuated to 2 mm. mercury pressure. An arc of about 166–175 amperes was established and the pressure was reduced to 170–192 microns as measured by a McLeon gage attached to the chamber. The arc length was about 1/2 inch and the voltage was 34. The upper cathode coil was operated at 110 amperes current to provide a magnetic field within the center of the coil of about 800 gauss. The lower anode coil current was adjusted to a value of about 50 amperes which resulted in a magnetic field within the center of the coil of about 500 gauss. The lower field was in opposing relation to the upper field resulting in substantially zero field at the molten boule cap. Thirty-two tungsten wires 1/16-in. dia. and about 6-in. long were fed into the molten boule cap over a 3-hour period to form a boule 1/2–17/32-in. dia. and 4-in. long. The pressure at the boule growing surface was calculated to be about 30 microns of mercury. Argon was fed to the boule surface at 15 cc./min. Spectroscopic analysis of this substantially unicrystalline product did not detect many of the metallic impurities usually found in tungsten boules grown by atmospheric arc methods using the same raw material. Non-metallic interstitial impurities, such as oxygen and carbon were appreciably lower than those found in boules grown by atmospheric arc methods.

The following example shows the versatility of the process in growing boules of other materials.

*Example III.—Growth of molybdenum boule*

Apparatus of the type shown in FIG. 1 was used. The cathode was a 1/8-in. dia. thoriated tungsten stick electrode, and the anode was a 1/2-in. dia. molybdenum rod about 5-in. long. The chamber was evacuated to 2 mm. mercury pressure. An arc of about 100 amperes was established and the pressure was reduced to 170–240 microns. The current was then increased to 125–150 amperes at a voltage of 27–29. The upper cathode coil was operated at 110 amperes current to provide a magnetic field within the center of the coil of about 800 gauss. The lower anode coil current was started at 10 amperes which resulted in a magnetic field within the center of the coil of about 80 gauss in opposition to the upper field. Molybdenum rod at 1/16-in. dia. and about 6-in. long was fed into the molten anode cap. The pressure at the boule growing surface was calculated to be about 30 microns of mercury. Argon was fed at the boule surface at 20 cc./min. The opposing magnetic fields did not cancel each other at the molten cap region and the boule began to grow in a corkscrew fashion. This was caused by the rotation induced by the magnetic field. The current in the lower coil was then increased to 55–70 amperes (500–600 gauss) and the boule cap settled down. The remainder of the boule growth was at a reasonably constant diameter without any ripples caused by rotation. The substantially unicrystalline product boule was about 2-in. long and 1/2–15/16-in. dia. Analysis indicated a carbon content of less than 2 parts per million and an oxygen content of 10 p.p.m. These are substantially below the values of about 30 p.p.m. for molybdenum boules grown in an atmospheric pressure arc process using same raw material.

Figure 2:
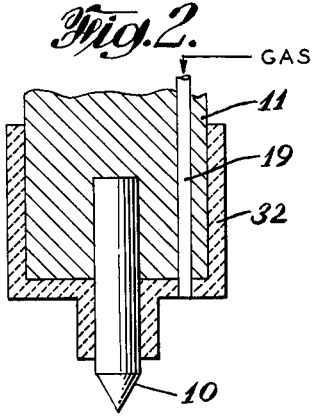
FIGURE 2 is a cross-sectional view of a modification of the cathode structure.

It has been found that under reduced pressure, magnetically-stabilized arc conditions the arc will tend to strike from any portion of the apparatus connected to the cathode. Thus the arc occasionally will jump to the electrode holder and associated equipment causing severe erosion. It is desirable to eliminate this spurious arcing. It is also desirable to maintain the cathode region in as small an area as possible to increase the arc intensity. One apparatus modification useful for achieving these goals is shown in FIG. 2. The electrode 10 and electrode holder 11 are substantially covered with an insulating layer 32. The arcing tip of electrode 10 is left uncovered in a desired amount of cathode area. As in the case of FIG. 1, the gas is fed to the chamber through conduit 19.

Use of the insulated cathode is described in the following example.

*Example IV.—Improved cathode apparatus*

Apparatus of the type shown in FIG. 1 was used wherein a modified cathode of the type shown in FIG. 2 was used. A 1/8-in. dia. thoriated tungsten electrode was supported in a brass collet. Total exposed length of electrode was 3-in. The brass collet and 2-in. of the electrode length were coated with a 0.005 in. thick layer of alumina applied by means of a high temperature, high velocity coating process. An arc was established between this cathode and a tungsten crystal under pressure of 300 microns mercury. The magnetically stabilized arc column was only as wide as the electrode itself (⅛-in. dia.). The lower portion of the arc could be spread only a little as compared to previous arcs from uncoated electrode and collet. This experiment establishes the utility of changing the shape and intensity of a magnetically-stabilized, low-pressure arc by use of insulation on the cathode and all other cathodic areas.

The above description has been directed toward the use of boule raw material in wire form. This form has been quite useful and is preferred. However, it should be understood that the present invention is not so limited since powdered material can also be employed if adequate dispensing apparatus is used.

It is also noted that the cathode holder and the chamber walls are usually water-cooled in order to prevent overheating under the arc crystal growth conditions.

Under the growth conditions in the chamber, the vapor pressure of the molten boule material at the boule cap is in the order of 1–1000 microns. At chamber reduced pressure of 200 microns or less, the boule material vapor can provide an appreciable portion of the total chamber pressure and especially the pressure over the molten cap. It is considered a correct technical position to thus refer to the arc in this process as being maintained in a boule material vapor-inert gas atmosphere. Any purge gas may be used which is inert to the boule, electrodes and other apparatus which comes in contact with the gas.

The discussion thus far has been principally directed to a process for growing crystalline boules which are intended for uses based on their crystalline character. For this purpose boules having large substantially unicrystalline segments are desired. This novel process also has utility in the production of high purity metal ingots which could be used in the further fabrication of metal shapes. For purposes of this disclosure, the only difference between a boule and an ingot is in the size of each. An ingot is a large boule. For this purpose polycrystalline material can be useful as well as substantially unicrystalline ingots. In this aspect of the invention, it can be considered as a metal melting and consolidating process.

For production of metal ingots the subject process has decided advantages over the prior art. Previous metal melting processes employing a magnetically controlled arc as the heat source required the ingot product to be contained within a crucible during the melting and solidification steps. Even though the crucible was water-cooled below its melting point, there was always the possibility of some contamination of the melt by crucible material as well as a loss of melt material which adhered to the crucible walls. Furthermore, if large substantially unicrystalline segments are desired, the temperature gradients in the ingot between the hot core and the cold crucible surface tend to defect their formation and tend to form polycrystalline products. It has also been found that when a crucible or cold mold is used the surface of the resulting ingot tends to be rough and uneven. This is a decided disadvantage when smooth, substantially constant diameter ingots are desired. A further disadvantage also exists for a crucible or cold mold. When the molten material begins to fill up the bottom of the mold, impurities vaporized from the melt tend to condense along the colder upper portions of the mold. As the ingot fills the upper portions of the mold, these impurities are again dissolved in the ingot resulting in an impure product. The present improved process does not use a crucible and thus eliminates all of the crucible disadvantages.

One method of metal melting that is presently used in industry is the electron beam melting process. This prior process has the disadvantage of requiring a extremely low pressure in the order of 0.01–1 microns which necessitates bulky and expensive equipment to obtain and maintain such vacuum condition. Furthermore, the electron beam melting process requires a fairly complex electron gun for generating a stream of electrons and a focusing system for controlling the position and shape of the electron impingement area on the workpiece. It is thus apparent that the simplified apparatus of the present invention is an improvement over the electron beam melting art.

In addition to the tungsten and molybdenum boules described above, this process is also useful for growing boules or ingots of other refractory metals, such as tantalum and columbium, as well as metal compounds and alloys.

What is claimed is:

1. A process for growing electrically conductive crystalline boules from boule forming raw materials in an enclosed evacuable chamber which comprises continuously evacuating said chamber to a pressure of less than about 30 mm. mercury; striking a low pressure arc in said chamber between a first non-consumable electrode and a second electrode; providing a magnetic field having a strength of at least 200 gauss in the region of said first non-consumable electrode substantially parallel to the longitudinal direction of said arc; providing a second magnetic field in the region of said second electrode in opposing magnetic relation to said first magnetic field and of sufficient strength to substantially cancel each other in the region of said second electrode; feeding said boule forming raw material into said arc; depositing the molten boule material onto said second electrode to start a molten cap for the formation if a boule; maintaining the pressure at the molten boule cap of said boule at less than 30 microns while injecting an inert gas into said chamber to carry away volatized impurities; and accumulating such molten boule material on said second electrode as an ultra-high purity crystalline boule.

2. A process for growing electrically conductive crystalline boules from boule forming raw materials in an enclosed evacuable chamber which comprises continuously evacuating said chamber to a pressure of from about 50 microns to 3 mm. Hg; striking a low pressure arc in said chamber between a first non-consumable electrode and a second electrode; providing a magnetic field having a strength of at least 200 gauss in the region of said first non-consumable electrode substantially parallel to the longitudinal direction of said arc; providing a second magnetic field in the region of said second electrode in opposing magnetic relation to said first magnetic field and of sufficient strength to substantially cancel each other in the region of said second electrode; feeding said boule forming raw material into said arc; depositing the molten boule material onto said second electrode to start a molten cap for the formation of a boule; maintaining the pressure at the molten cap of said boule at less than 30 microns while injecting an inert gas into said chamber to carry away volatized impurities; and accumulating such molten boule material on said second electrode as an ultra-high purity crystalline boule.

References Cited by the Examiner

UNITED STATES PATENTS

| | | | |
|---|---|---|---|
| 2,040,215 | 5/1936 | Rava | 75—10 X |
| 2,679,080 | 5/1954 | Olsen | 148—1.6 |
| 2,686,864 | 8/1954 | Wroughton et al. | 23—301 |
| 2,723,916 | 11/1955 | Lynd et al. | 23—301 |
| 2,727,936 | 12/1955 | Boyer | 75—10 X |
| 2,754,259 | 7/1956 | Robinson et al. | 23—301 |
| 2,761,002 | 8/1956 | Laird et al. | 75—10 |
| 2,965,456 | 12/1960 | Clark et al. | 23—273 |
| 2,970,895 | 2/1961 | Clark et al. | 23—301 |
| 3,012,374 | 12/1961 | Merker | 148—1.6 |
| 3,053,639 | 9/1962 | Dolloff | 23—301 |
| 3,057,703 | 10/1962 | Knapic | 148—1.6 |
| 3,078,150 | 2/1963 | Raymond | 148—1.6 |

DAVID L. RECK, *Primary Examiner.*